United States Patent
Davydov et al.

(10) Patent No.: US 10,390,337 B2
(45) Date of Patent: *Aug. 20, 2019

(54) APERIODIC CHANNEL STATE INFORMATION (CSI) REPORTING FOR CARRIER AGGREGATION

(71) Applicant: Intel Corporation, Santa Clara, CA (US)

(72) Inventors: Alexei Davydov, Nizhny Novgorod (RU); Hong He, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,579

(22) Filed: Jan. 23, 2018

(65) Prior Publication Data

US 2018/0302894 A1 Oct. 18, 2018

Related U.S. Application Data (63) Continuation of application No. 14/708,545, filed on May 11, 2015, now Pat. No. 9,883,491.

(Continued)

(51) Int. Cl.
*H04B 7/06* (2006.01)
*H04L 1/00* (2006.01)
(Continued)

(52) U.S. Cl.
CPC ...... *H04W 72/0413* (2013.01); *H04B 7/0626* (2013.01); *H04B 7/0632* (2013.01);
(Continued)

(58) Field of Classification Search
CPC .. H04B 7/0626; H04B 7/0632; H04B 7/0643; H04L 1/0026; H04L 5/0007; H04L 5/001;
(Continued)

(56) References Cited

U.S. PATENT DOCUMENTS 9,007,933 B2 * 4/2015 Wu .................. H04W 72/0406
370/252
9,154,251 B2 * 10/2015 Etemad .................. H04W 4/90
(Continued)

FOREIGN PATENT DOCUMENTS

WO 2011/085230 A1 7/2011

OTHER PUBLICATIONS

Huawei, et al. "Triggering and transmission of aperiodic CSI reports." R1-105838. 3GPP TSG RAN WG1 Meeting #63. Jacksonville, USA, Nov. 15-19, 2010. 7 pages.
(Continued)

*Primary Examiner* — Asad M Nawaz
*Assistant Examiner* — Kai Chang
(74) *Attorney, Agent, or Firm* — Eschweiler & Potashnik, LLC (57) ABSTRACT

Aperiodic channel state information (CSI) reporting is discussed. An example user equipment includes a receiver circuit, processor, and transmitter circuit. The receiver circuit receives transmissions from a plurality of serving cells via a carrier aggregation (CA) mode and receives an aperiodic CSI reporting request indicating a set for CSI reporting. The plurality of serving cells comprises at least six serving cells, and one or more of the plurality is associated with the indicated set. The processor is operably coupled to the receiver circuit and calculates one or more CSI parameters for each serving cell of the plurality that is associated with the indicated set; and generates an aperiodic CSI report based at least in part on the calculated CSI parameters for each serving cell associated with the indicated set. The transmitter circuit transmits the aperiodic CSI report to an Evolved NodeB (eNB) via a physical uplink shared channel (PUSCH).

24 Claims, 5 Drawing Sheets

Related U.S. Application Data (60) Provisional application No. 62/109,448, filed on Jan. 29, 2015.

(51) Int. Cl.
 *H04L 5/00* (2006.01)
 *H04W 72/04* (2009.01)

(52) U.S. Cl.
 CPC ......... *H04B 7/0643* (2013.01); *H04L 1/0026* (2013.01); *H04L 5/001* (2013.01); *H04L 5/0007* (2013.01); *H04L 5/0053* (2013.01); *H04L 5/0057* (2013.01)

(58) Field of Classification Search
 CPC . H04L 5/0053; H04L 5/0057; H04W 72/0413
 See application file for complete search history.

(56) References Cited

U.S. PATENT DOCUMENTS

| | | | |
|---|---|---|---|
| 9,401,796 B2 | 7/2016 | Wu et al. | |
| 9,572,063 B2* | 2/2017 | Etemad | H04W 4/70 |
| 9,854,593 B2* | 12/2017 | Wu | H04W 72/0406 |
| 2011/0249578 A1* | 10/2011 | Nayeb Nazar | H04L 1/0027 |
| | | | 370/252 |
| 2012/0127869 A1 | 5/2012 | Yin et al. | |
| 2013/0142163 A1* | 6/2013 | Liu | H04L 1/0026 |
| | | | 370/329 |
| 2013/0194931 A1 | 8/2013 | Lee et al. | |
| 2013/0195045 A1 | 8/2013 | Papasakellariou et al. | |
| 2013/0258986 A1 | 10/2013 | Seo et al. | |
| 2013/0315185 A1* | 11/2013 | Kim | H04W 24/10 |
| | | | 370/329 |
| 2013/0322376 A1* | 12/2013 | Marinier | H04W 72/06 |
| | | | 370/329 |
| 2014/0044076 A1* | 2/2014 | Etemad | H04W 4/90 |
| | | | 370/329 |
| 2014/0086084 A1* | 3/2014 | Bi | H04L 1/0026 |
| | | | 370/252 |
| 2014/0086174 A1* | 3/2014 | Nam | H04L 1/0003 |
| | | | 370/329 |
| 2015/0249998 A1* | 9/2015 | Long | H04W 24/02 |
| | | | 370/329 |
| 2016/0157184 A1 | 6/2016 | Wang et al. | |
| 2017/0353222 A1* | 12/2017 | Wei | H04B 7/0469 |

OTHER PUBLICATIONS

International Search Report and the Written Opinion of the International Searching Authority dated Feb. 19, 2016 Application No. PCT/U2015/062403.

"LTE; Evolved Universal Terrestrial Radio Access (E-UTRA); Physical layer procedures (3GPP TS 36.213 version 12.5.0 Release 12)." ETSI TS 136 213 v12.5.0 (Apr. 2015), 242 pages.

Notice of Allowance dated Sep. 27, 2017 for U.S. Appl. No. 14/708,545.

Non-Final Office Action dated Feb. 21, 2017 for U.S. Appl. No. 14/708,545.

\* cited by examiner

APERIODIC CHANNEL STATE INFORMATION (CSI) REPORTING FOR CARRIER AGGREGATION

REFERENCE TO RELATED APPLICATIONS

This application is a continuation of U.S. application Ser. No. 14/708,545 filed on May 11, 2015, which is claims priority to U.S. Provisional Application No. 62/109,448 filed Jan. 29, 2015, entitled "METHOD OF APERIODIC CSI REPORTING FOR CARRIER AGGREGATION WITH MORE THAN 5 COMPONENT CARRIERS", the contents of which are herein incorporated by reference in their entirety.

FIELD

The present disclosure relates to channel state information (CSI) reporting and more particularly to aperiodic CSI reporting in carrier aggregation (CA) situations involving more than five serving cells.

BACKGROUND

Demand for high data rate wireless broadband transmission is increasing, with mobile data traffic expected to increase exponentially over the next decade. Carrier aggregation is a major tool to address this increased demand. Carrier aggregation is used in Long Term Evolution (LTE)-Advanced (LTE-A) systems to improve the data throughput by increasing the total bandwidth of the transmission. Carrier aggregation in LTE-A has been supported since Release 10 of the LTE-A specification ("Rel-10") and can be used for both frequency division duplexing (FDD) and time division duplexing (TDD) systems. In FDD, the number of aggregated carriers (serving cells) can be different between downlink (DL) and uplink (UL), while for TDD, the number of carriers for both DL and UL is typically the same. The number of DL component carriers is generally greater than or the same than the number of UL carriers. The individual component carriers in DL or UL can also be of different bandwidths, with currently supported bandwidths of 1.4, 3, 5, 10, 15 and 20 MHz. In accordance with Rel-10, a maximum of five component carriers can be aggregated. However, the number of carriers that can be aggregated is expected to be further increased in Rel-13, allowing support for up to 32 component carriers.

There are different types or modes of carrier aggregation (CA). CA can aggregate contiguous component carriers within the same operating frequency band, referred to as intra-band contiguous carrier aggregation. However, due to spectrum allocation restriction, intra-band contiguous carrier aggregation may not always be possible, and non-contiguous aggregation can be used instead. Non-contiguous carrier frequency allocations can either be intra-band or inter-band, depending whether the aggregated component carriers belong to the same operating frequency band or belong to different operating frequency bands.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Embodiments described herein can provide for aperiodic channel state information (CSI) reporting in carrier aggregation (CA) situations involving more than five component carriers.

LTE-A supports two types of CSI reporting—periodic reporting on the physical uplink control channel (PUCCH) and aperiodic reporting on the physical uplink shared channel (PUSCH).

Periodic CSI reporting is mainly used to indicate the channel quality of downlink channel at the UE on a long-term basis. Periodic CSI is provided by the UE in accordance with a predefined reporting time schedule configured by the serving cell using higher layer signaling (e.g., radio resource control (RRC)). In contrast, aperiodic CSI reporting is used to provide larger and more detailed reporting in a single reporting instance based on the dynamic CSI request triggered by the serving cell using either an uplink DCI (downlink control information) format or a Random Access Response Grant.

Aperiodic CSI reporting is triggered by the CSI request field, which in the case of carrier aggregation in conventional LTE-A systems has a length of 2 bits and has the definitions provided below in table 1 (corresponding to Table 7.2.1-1A of LTE-A Technical Specification (TS) 36.213):

TABLE 1

CSI Request field for PDCCH/EPDCCH with uplink DCI format in UE specific search space

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In accordance to section 6.3.2 of TS 36.331, the first and second sets of the serving cells corresponding to CSI request fields '10' and '11' may be configured with at most 5 serving cells. Therefore, as can be seen in table 1, the CSI request field values of '10' and '11' can request CSI across up to the maximum number of component carriers that can be supported in conventional LTE-A systems (i.e., up to 5 in LTE-A Rel-12). Aspects described herein can support aperiodic CSI reporting in connection with carrier aggregation of up to 32 component carriers (serving cells).

In a first set of embodiments, 1 or 2 additional bits (or more bits, in various aspects) can be included in DCI or RAR grant for the CSI request field to allow CSI triggering for any additional (higher layer configured) sets of serving cells. In aspects, the maximum number of serving cells for each value of the CSI request field can be limited to 5, as in conventional LTE-A systems, which can keep CSI computational complexity and channel coding procedures for UCI (uplink control information) the same. The inclusion of two additional bits, for example, can support up to seventy serving cells (fourteen sets comprising up to five serving cells each), more than sufficient for the anticipated extension to 32 serving cells in Rel-13. Example CSI request field values for embodiments involving 1 additional bit (for 3 total bits) and 2 additional bits (for 4 total bits) are shown below in tables 2 and 3, respectively:

TABLE 2

CSI Request field for PDCCH/EPDCCH with uplink DCI format in UE specific search space

| Value of CSI request field | Description |
| --- | --- |
| '000' | No aperiodic CSI report is triggered |
| '001' | Aperiodic CSI report is triggered for serving cell c |
| '010' | Aperiodic CSI report is triggered for a $1^{st}$ set of serving cells configured by higher layers |
| '011' | Aperiodic CSI report is triggered for a $2^{nd}$ set of serving cells configured by higher layers |
| . . . | . . . |
| '111' | Aperiodic CSI report is triggered for a $6^{th}$ set of serving cells configured by higher layers |

TABLE 3

CSI Request field for PDCCH/EPDCCH with uplink DCI format in UE specific search space

| Value of CSI request field | Description |
| --- | --- |
| '0000' | No aperiodic CSI report is triggered |
| '0001' | Aperiodic CSI report is triggered for serving cell c |
| '0010' | Aperiodic CSI report is triggered for a $1^{st}$ set of serving cells configured by higher layers |
| '0011' | Aperiodic CSI report is triggered for a $2^{nd}$ set of serving cells configured by higher layers |
| . . . | . . . |
| '1111' | Aperiodic CSI report is triggered for a $14^{th}$ set of serving cells configured by higher layers |

In a second set of embodiments, the number of serving cells set for CSI triggers '10' and '11' can be increased to more than 5 serving cells. In order to reduce signaling overhead, and to maintain the CSI computational complexity and coverage of UCI transmission on PUSCH, the subband sizes for channel quality indicator (CQI) and precoding matrix indicator (PMI) reporting can be increased compared to conventional subband size value values. The increased subband values can be used when the total aggregated bandwidth is more than 500 or 550 resource blocks (RBs) (the maximum aggregated bandwidth of conventional LTE-A systems). The subband sizes on all configured carriers can be scaled by a value S, where S can be one or more fixed values defined by the specification based on the aggregated bandwidth, or can determined as $\text{ceil}(N_{tot}^{RB}/550)$, where ceil(x) (the ceiling function) is the smallest integer not less than x, and $N_{tot}^{RB}$ is total number of RBs across all aggregated carriers or across the aggregated carriers corresponding to a given CSI request field value. In other embodiments, the subband size may be determined as $\text{ceil}(k_i \cdot N_{tot}^{RB}/550)$, where $k_i$ is a subband size in the i-th serving cell. In further embodiments, aspects of both the first set of embodiments and the second set of embodiments can be combined.

Figure 1:
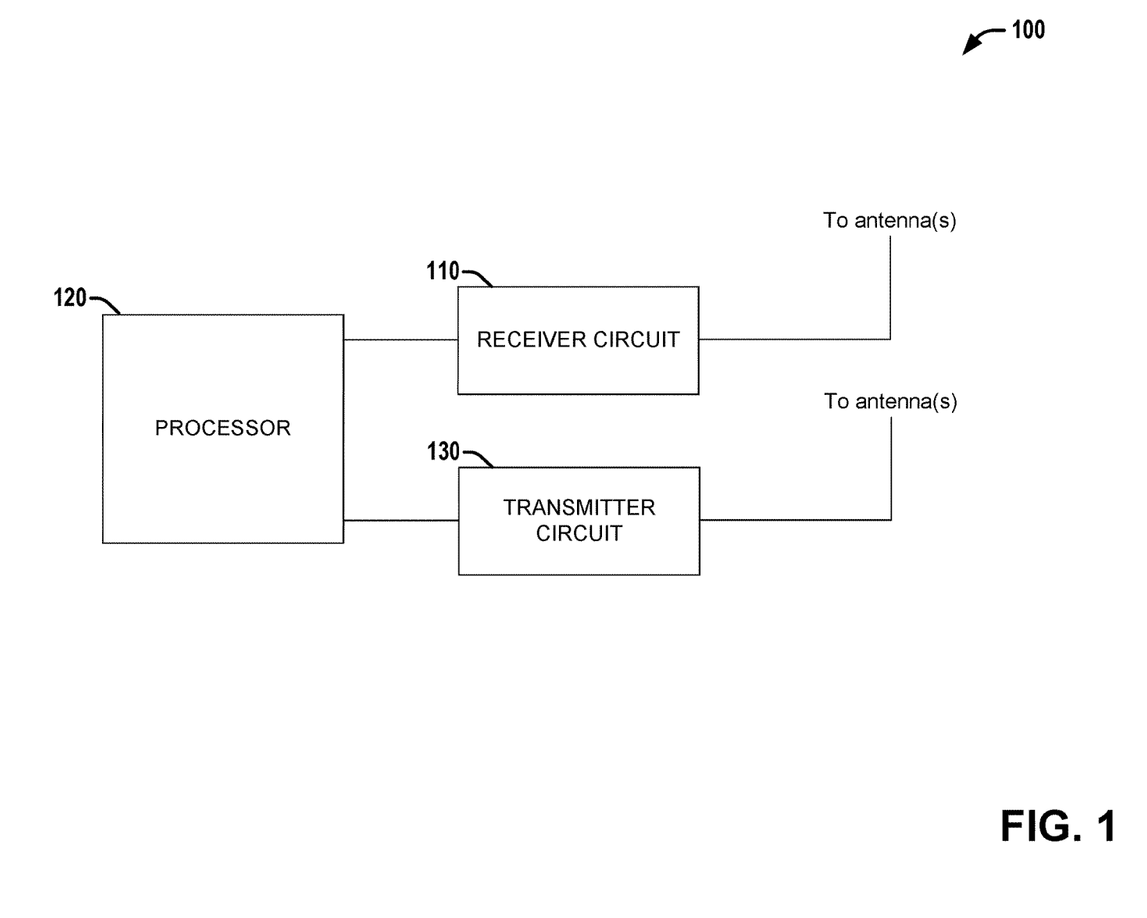
FIG. 1 is a block diagram of a system that facilitates aperiodic channel state information (CSI) reporting for more than five serving cells at a user equipment (UE) according to various aspects described herein.

Referring to FIG. 1, illustrated is a block diagram of a system 100 that facilitates aperiodic channel state information (CSI) reporting for more than five serving cells at a user equipment (UE) according to various aspects described herein. System 100 includes a receiver circuit 110, a processor 120, and a transmitter circuit 130. Each of the receiver circuit 110 and the transmitter circuit 130 are configured to be coupled to one or more antennas, which can be the same or different antenna(s). In aspects, the receiver circuit 110 and transmitter circuit 130 can have one or more components in common, and both can be included within a transceiver circuit, while in other aspects they are not. In various aspects, system 100 can be included within a UE, for example, with system 100 (or portions thereof) within a receiver and transmitter or a transceiver circuit of a UE.

The receiver circuit 110 can receive transmissions via a plurality of serving cells in accordance with a carrier aggregation (CA) mode of operation. In various aspects, the plurality of serving cells is more than five serving cells, but it need not be. Although conventional LTE-A systems are incapable of addressing aperiodic channel state information (CSI) reporting situations involving more than five serving cells, embodiments described herein can provide for aperiodic CSI reporting for up to five serving cells (which conventional systems are also capable of) and more than five serving cells (which conventional systems are incapable of), for example, for up to thirty-two serving cells (or more, in various aspects). Additionally, receiver circuit 110 can receive a request for aperiodic CSI reporting, for example, via a CSI request field value transmitted via an uplink DCI (downlink control information) message or random access response (RAR) grant.

The request for CSI reporting can designate (e.g., via the CSI request field value) a set (e.g., which can be configured via higher layers) for aperiodic CSI reporting. As indicated in tables 1 through 3 above, the set can be a set of serving cells (e.g., similar to Table 7.2.1-1A of LTE-A TS 36.213), or the set can be a set of CSI processes (e.g., similar to Table 7.2.1-1 B of LTE-A TS 36.213), or the set can be a set of CSI processes and or {CSI process, CSI subframe set}-pairs (e.g., similar to Table 7.2.1-1C of LTE-A TS 36.213). In general, the set can include one or more elements, where each of the elements can be a serving cell, a CSI process, or a pair of a CSI process and a CSI subframe set (a {CSI process, CSI subframe set}-pair). For each CSI request field value, a set (of serving cells, CSI process, pairs of CSI processes and CSI subframe sets, or some combination thereof) is indicated as discussed above. Based on the CSI request field value, an associated set of serving cells (which can be the indicated set when the indicated set comprises only serving cells, or can be a set of serving cells otherwise associated with the indicated set) can be determined, for which an aperiodic CSI report is to be generated.

As discussed above, in various embodiments, the CSI request field can vary. For example, in a first set of embodiments, the CSI request field can comprise more than two bits (e.g., three bits, four bits, etc.), with all but two of the values (i.e., six values, fourteen values, etc.) indicating a set (of serving cells, CSI process, pairs of CSI processes and CSI subframe sets, or some combination thereof) of up to five elements. Example CSI request field values for embodiments of the first set of embodiments are provided supra, in tables 2 and 3 (for sets of serving cells indicated by CSI request field values; similar values can be employed for CSI processes, pairs of CSI processes and CSI subframe sets, etc.).

In a second set of embodiments, all but two of the values of the CSI request field can indicate a set that can comprise any number of elements (e.g., potentially more than five elements, in contrast to the first set of embodiments). In various aspects, such embodiments can employ a two bit CSI request field, as in conventional LTE-A systems (although a greater number of bits can be employed in various embodiments). However, signaling overhead and CSI computational complexity can be reduced by increasing the subband size for channel quality indicator (CQI) and/or precoding matrix indicator (PMI) reporting based on a scale factor. For each CSI request field value, the scale factor can be either one or more fixed values defined by a specification (e.g., based on an aggregated bandwidth) for a radio access technology associated with the embodiment, or can be the smallest integer greater than the quotient of an aggregated bandwidth (e.g., a total number of resource blocks (RBs) of the set of serving cells associated with the CSI request field value or of all serving cells) divided by a reference bandwidth (e.g., a maximum conventional bandwidth, such as 500 or 550 RBs).

For each serving cell associated with the CSI request field value, processor 120 can calculate one or more CSI parameters (e.g., rank indicator (RI), precoding matrix indicator (PMI), precoding type indicator (PTI), channel quality indicator (CQI)), for example, for each of one or more subbands. Based on the calculated CSI parameter(s), processor 120 can generate an aperiodic CSI report for the set (of serving cells, CSI process, pairs of CSI processes and CSI subframe sets, or some combination thereof) indicated by the CSI request field value.

Transmitter circuit 130 can transmit the aperiodic CSI report via a physical uplink shared channel (PUSCH) to an Evolved NodeB (eNB) in response to the aperiodic CSI reporting request.

Figure 2:
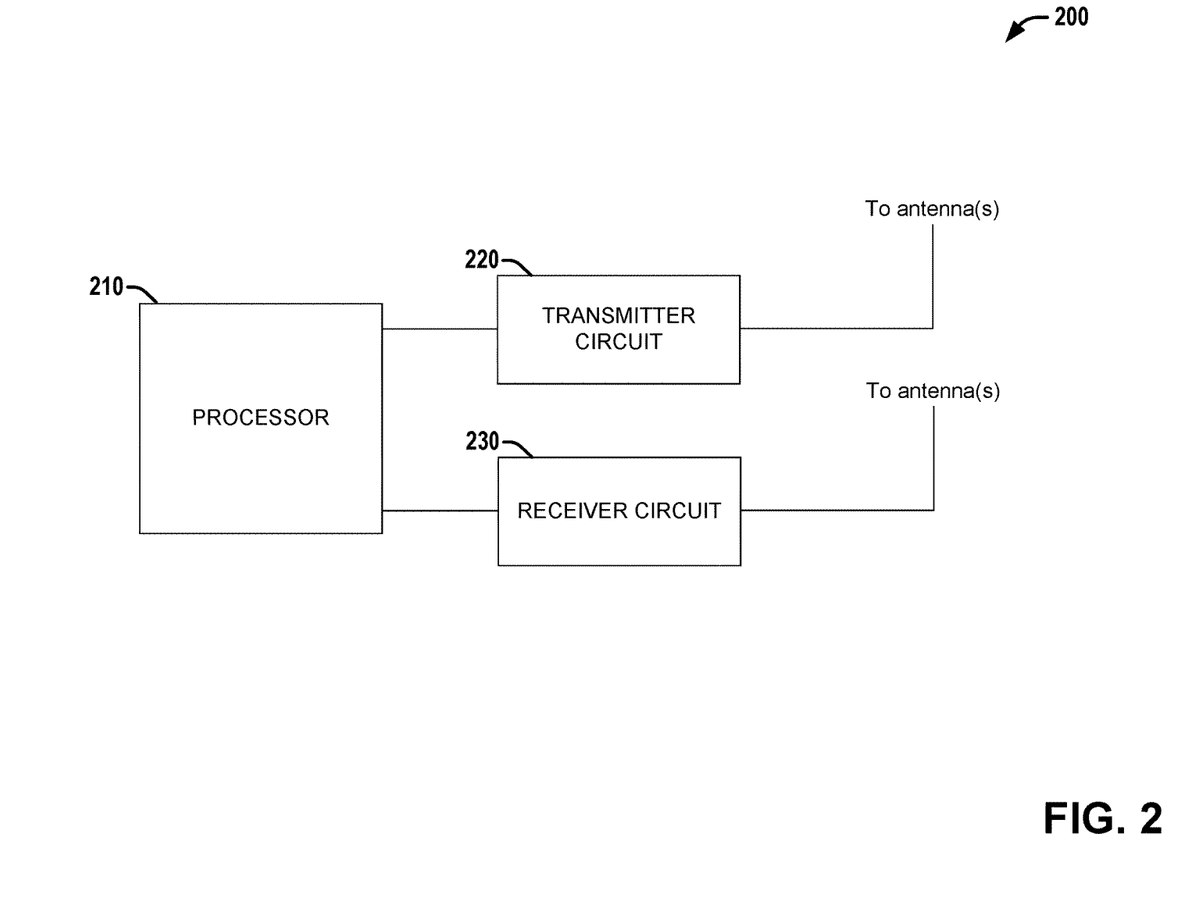
FIG. 2 is a block diagram of a system that facilitates CSI configuration at an Evolved NodeB (eNB) for aperiodic CSI reporting from a UE for more than five serving cells according to various aspects described herein.

Referring to FIG. 2, illustrated is a block diagram of a system that facilitates CSI configuration at an Evolved NodeB (eNB) for aperiodic CSI reporting from a UE for more than five serving cells according to various aspects described herein. System 200 can include a processor 210, a transmitter circuit 220, and a receiver circuit 230. Each of the receiver circuit 230 and the transmitter circuit 220 are configured to be coupled to one or more antennas, which can be the same or different antenna(s). In aspects, the receiver circuit 230 and transmitter circuit 220 can have one or more components in common, and both can be included within a transceiver circuit, while in other aspects they are not. In various aspects, system 200 can be included within an Evolved Universal Terrestrial Radio Access Network (E-UTRAN) Node B (Evolved NodeB, eNodeB, or eNB).

Out of a plurality (e.g., up to thirty-two, or potentially more, etc.) of serving cells for carrier aggregation (CA), processor 210 can assign each serving cell to at least one set of a plurality of sets. Each of the plurality of sets can correspond to or be associated with a CSI request field value. As discussed supra, in a first set of embodiments, the CSI request field can comprise three or more bits, with at least six of the CSI request field values indicating a set comprising elements that can be serving cell(s), CSI process(es), and/or pair(s) of a CSI process and a CSI subframe set. In a second set of embodiments, each set indicated by a CSI request field value can (but need not) comprise more than five elements, and depending on the aggregated bandwidth, a subband size for CQI and/or PMI reporting can be scaled. Processor 210 can additionally determine a set for aperiodic CSI reporting, and generate the CSI request field value associated with the determined set.

Transmitter circuit 220 can transmit one or more data payloads to a UE according to a carrier aggregation (CA) mode of operation, and can transmit the CSI request field value to the UE. In various aspects, transmitter circuit 220 can transmit the CSI request field value via an uplink DCI message or a random access request grant.

Receiver circuit 230 can receive an aperiodic CSI report from the UE via a physical uplink shared channel (PUSCH). Optionally, processor 210 can adjust at least one property of at least one of the serving cells of the set associated with the CSI request field value based at least in part on the aperiodic CSI report received from the UE.

Figure 3:
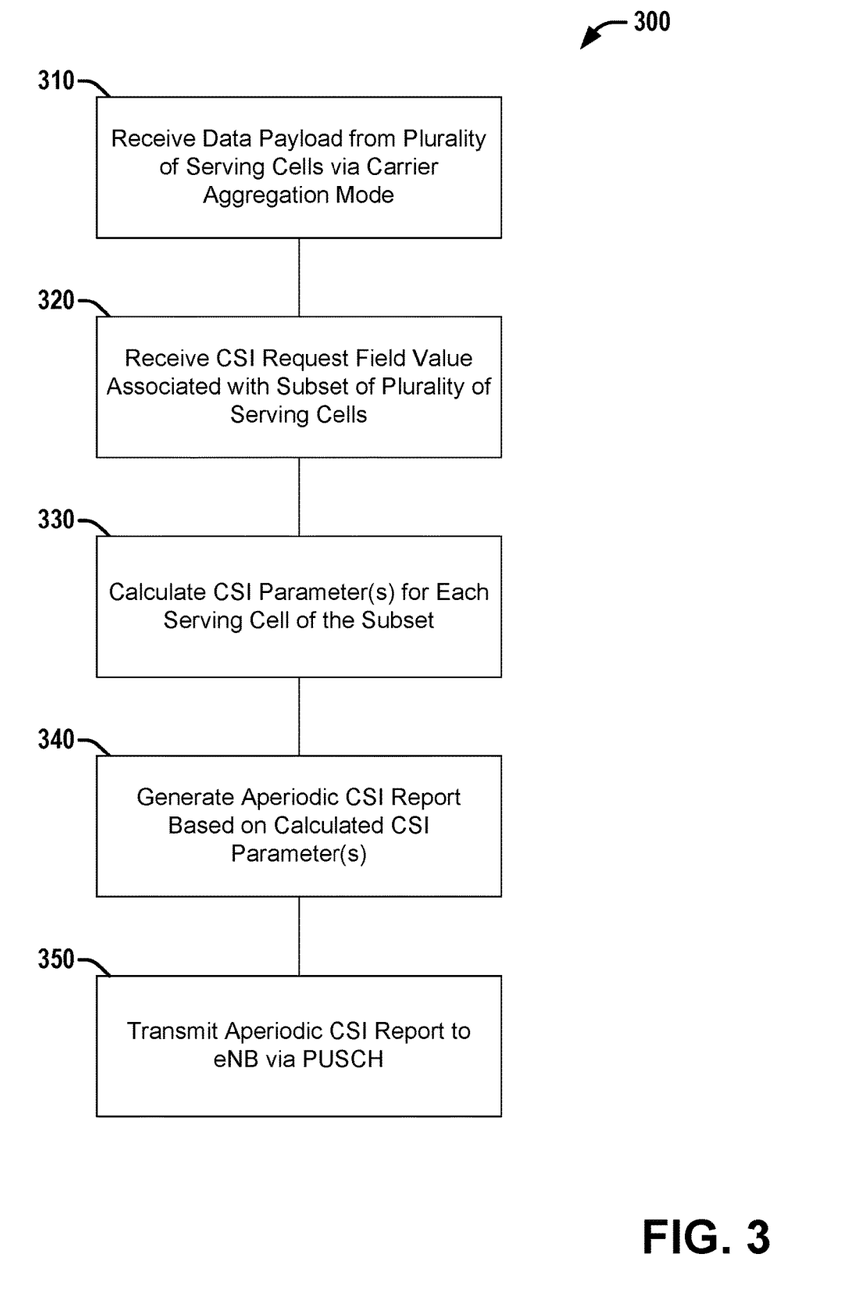
FIG. 3 is a flow diagram of a method that facilitates aperiodic CSI reporting for a plurality of DL cells at a UE according to various aspects described herein.

Referring to FIG. 3, illustrated is a flow diagram of a method 300 that facilitates aperiodic CSI reporting for a plurality of DL cells at a UE according to various aspects described herein. In various aspects, method 300 can be implemented at a UE, for example, by executing machine-readable instructions that cause the UE to perform some or all of the acts described in connection with method 300.

Method 300 includes, at 310, receiving a data payload from a plurality (e.g., more than five in various embodiments, such as up to thirty-two or more, etc.) of serving cells via a carrier aggregation (CA) mode of operation.

At 320, method 300 includes receiving a CSI request field value via at least one of an uplink DCI message or a random access request (RAR) grant. The CSI request field value is associated with a subset of the serving cells, either by directly indicating the subset, or by indicating a set (e.g., of CSI processes, etc.) associated with the subset. In a first set of embodiments, the CSI request field value can be one out of eight or more values, wherein at least six of the values can be associated with a set of up to five serving cells. In a second set of embodiments, the CSI request field can have two bits, wherein two potential CSI request field values can be associated with sets of any number of serving cells, and a subband size for reporting CQI and/or PMI can be scaled based on an aggregated bandwidth (e.g., of the subset, of the plurality of serving cells, etc.).

Additionally, at 330, one or more CSI parameters (e.g., of RI, PMI, CQI, etc.) can be calculated for each serving cell of the subset.

At 340, method 300 can include generating an aperiodic CSI report based on the calculated one or more CSI parameters.

Method 300 can also include, at 350, transmitting the aperiodic CSI report to an eNB via a physical uplink shared channel (PUSCH).

Figure 4:
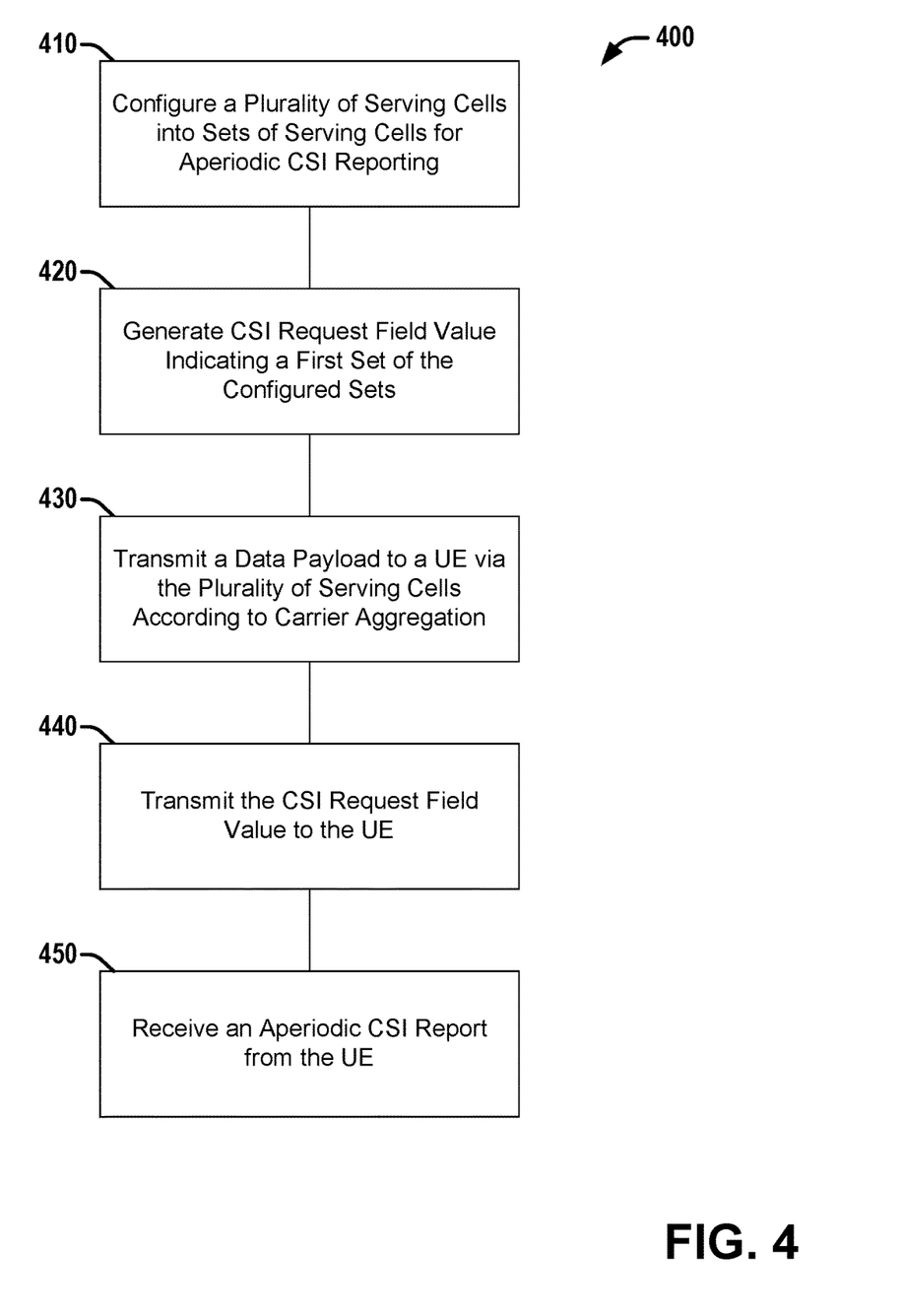
FIG. 4 is a flow diagram of a method that that facilitates CSI configuration at an Evolved NodeB (eNB) for aperiodic CSI reporting from a UE for more than five serving cells according to various aspects described herein.

Referring to FIG. 4, illustrated is a flow diagram of a method 400 that that facilitates CSI configuration at an Evolved NodeB (eNB) for aperiodic CSI reporting from a UE for more than five serving cells according to various aspects described herein. In various aspects, method 400 can be implemented at an eNB, for example, by executing machine-readable instructions that cause the eNB to perform some or all of the acts described in connection with method 400.

At 410, method 400 can include configuring a plurality of serving cells into sets of serving cells for aperiodic CSI reporting (e.g., by assigning serving cells to sets indicated by or associated with CSI request field values, etc.). As explained in greater detail supra, in a first set of embodiments, the CSI request field can comprise more than two bits, with all but two of the possible CSI request field values indicating a set of up to five serving cells, CSI processes, and/or pairs of CSI processes and CSI subframe sets. In a second set of embodiments, two (or potentially more) bits can be employed for the CSI request field, with all but two of the possible CSI request field values indicating a set that can contain more than five serving cells, CSI processes, and/or pairs of CSI processes and CSI subframe sets. In the second set of embodiments, a subband size for reporting CQI and/or PMI can be increased by a scale factor as described supra.

At 420, a CSI request field value can be generated to indicate a first set of the sets configured at 410.

At 430, a data payload can be transmitted to a user equipment (UE) via the plurality of serving cells according to a carrier aggregation (CA) mode of operation.

At 440, the CSI request field value generated at 420 can be transmitted to the UE.

At 450, an aperiodic CSI report can be received from the UE. Based on the aperiodic CSI report, one or more properties of at least one serving cell of the plurality of serving cells can be adjusted.

Figure 5:
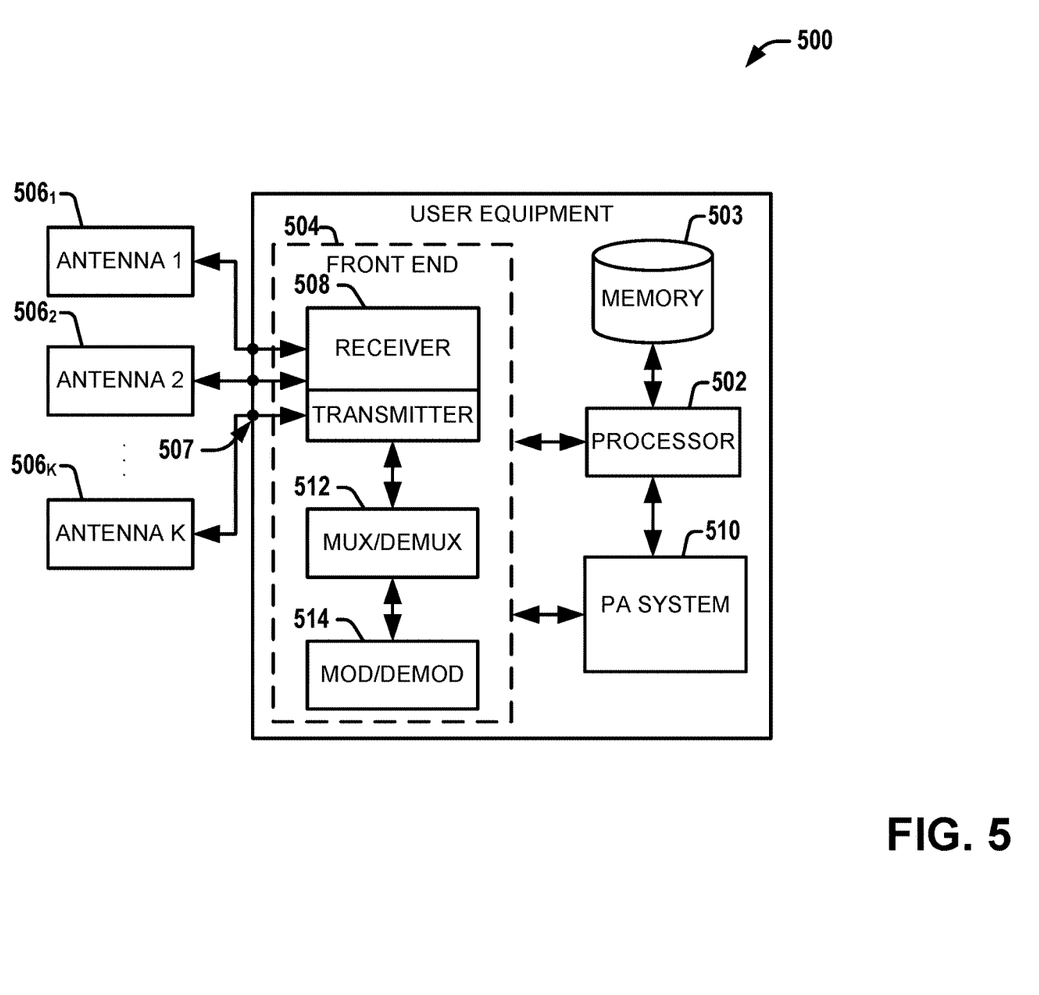
FIG. 5 is a block diagram illustrating an example UE usable in connection with various aspects described herein.

Referring to FIG. 5, illustrated is an exemplary user equipment or mobile communication device 500 that can be utilized with one or more aspects of the systems, methods, or devices facilitating communication with aggregation of downlink component carrier described herein according to various aspects. The user equipment 500, for example, comprises a digital baseband processor 502 that can be coupled to a data store or memory 503, a front end 504 (e.g., an RF front end, an acoustic front end, or the other like front end) and a plurality of antenna ports 507 for connecting to a plurality of antennas $506_1$ to $506_k$ (k being a positive integer). The antennas $506_1$ to $506_k$ can receive and transmit signals to and from one or more wireless devices such as access points, access terminals, wireless ports, routers and so forth, which can operate within a radio access network or other communication network generated via a network device. The user equipment 500 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters 508, a mux/demux component 512, and a mod/demod component 514. The front end 504, for example, is coupled to the digital baseband processor 502 and the set of antenna ports 507, in which the set of antennas $506_1$ to $506_k$ can be part of the front end.

The user equipment 500 can also include a processor 502 or a controller that can operate to provide or control one or more components of the user equipment 500. For example, the processor 502 can confer functionality, at least in part, to substantially any electronic component within the user equipment 500, in accordance with aspects of the disclosure. As an example, the processor 502 can be configured to execute, at least in part, executable instructions that facilitate generation of an aperiodic CSI report in situations involving carrier aggregation of more than five serving cells, in accordance with aspects described herein.

The processor 502 can operate to enable the user equipment 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, inter-packet times, etc. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 502 is functionally and/or communicatively coupled (e.g., through a memory bus) to memory 503 in order to store or retrieve information necessary to operate and confer functionality, at least in part, to communication platform or front end 504 including the receiver 508, and the power amplifier (PA) system 510. While the components in FIG. 5 are illustrated in the context of a user equipment, such illustration is not limited to user equipment but also extends to other wireless communication devices, such as base station (e.g., eNodeB), small cell, femtocell, macro cell, microcell, etc.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a user equipment (UE), comprising a receiver circuit, a processor, and a transmitter circuit. The receiver circuit is configured to receive transmissions via a plurality of serving cells according to a carrier aggregation (CA) mode and to receive an aperiodic channel state information (CSI) reporting request that indicates a set for CSI reporting, wherein the plurality of serving cells comprises at least six serving cells, and wherein one or more of the plurality of serving cells is associated with the indicated set. The processor is operably coupled to the receiver circuit and configured to: calculate one or more CSI parameters for each serving cell of the plurality of serving cells that is associated with the indicated set; and generate an aperiodic CSI report based at least in part on the calculated CSI parameters for each serving cell associated with the indicated set. The transmitter circuit is configured to transmit the aperiodic CSI report to an Evolved NodeB (eNB) via a physical uplink shared channel (PUSCH).

Example 2 includes the subject matter of example 1, wherein the plurality of serving cells comprises thirty-two or less serving cells.

Example 3 includes the subject matter of any of examples 1-2, including or omitting optional features, wherein the CSI request field comprises at least three bits.

Example 4 includes the subject matter of any of examples 1-3, including or omitting optional features, wherein the aperiodic CSI report request comprises a first value of a plurality of values associated with a CSI request field, wherein the first value indicates the set, wherein the set is one of at least three sets indicated via at least three of the plurality of values, and wherein each of the at least three sets indicates at most five elements.

Example 5 includes the subject matter of any variation of example 4, including or omitting optional features, wherein each of the at most five elements is a serving cell.

Example 6 includes the subject matter of any variation of example 4, including or omitting optional features, wherein each of the at most five elements is a serving cell or a CSI process.

Example 7 includes the subject matter of any variation of example 4, including or omitting optional features, wherein each of the at most five elements is a serving cell, a CSI process, or a pair of the CSI process and a CSI subframe set.

Example 8 includes the subject matter of example 1, wherein the CSI request field comprises two bits.

Example 9 includes the subject matter of example 1, wherein the calculated one or more CSI parameters comprise at least one of a channel quality indicator (CQI) or a precoding matrix indicator (PMI) for at least a first serving cell associated with the indicated set, and wherein a subband size associated with the CQI is increased in response to a determination that the total number of resource blocks (RBs) of the serving cells associated with the indicated set exceeds a predefined number of RBs, wherein the predefined number of RBs is one of 500 RBs or 550 RBs.

Example 10 includes the subject matter of example 9, wherein the subband size associated with the at least one of the CQI or the PMI is increased by a scale factor, wherein the scale factor is a smallest integer greater than a quotient obtained by dividing a total number of RBs of the serving cells associated with the indicated set by the predefined number of RBs.

Example 11 includes the subject matter of example 1, wherein the CSI request field comprises at least three bits.

Example 12 includes the subject matter of example 1, wherein the aperiodic CSI report request comprises a first value of a plurality of values associated with a CSI request field, wherein the first value indicates the set, wherein the set is one of at least three sets indicated via at least three of the plurality of values, and wherein each of the at least three sets indicates at most five elements.

Example 13 is a non-transitory machine readable medium comprising instructions that, when executed, cause a user equipment (UE) to: receive a data payload transmitted via more than five serving cells according to a carrier aggregation (CA) mode; receive a first value associated with a channel state information (CSI) request field, wherein the first value is associated with a first subset of the more than five serving cells; calculate at least one CSI parameter for each serving cell of the first subset; generate an aperiodic CSI report based at least in part on the at least one CSI parameter for each serving cell of the first subset; and transmit the aperiodic CSI report via a physical uplink shared channel (PUSCH).

Example 14 includes the subject matter of example 13, wherein the first value is received via a random access request (RAR).

Example 15 includes the subject matter of example 13, wherein the first value is received via a downlink control information (DCI) message.

Example 16 includes the subject matter of any of examples 13-15, including or omitting optional features, wherein the first value is one of at least eight values associated with the CSI request field, wherein at least six of the at least eight values are associated with subsets of the more than five serving cells.

Example 17 includes the subject matter of any variation of example 16, including or omitting optional features, wherein each of the subsets comprises at most five of the more than five serving cells.

Example 18 includes the subject matter of example 13, wherein the first subset comprises more than five of the more than five serving cells.

Example 19 includes the subject matter of example 18, wherein a subband size for reporting at least one of a channel quality indicator (CQI) or a precoding matrix indicator (PMI) associated with each serving cell of the first subset is increased based on a scaling factor equal to a smallest integer greater than a quotient obtained by dividing a total number of resource blocks (RBs) of the serving cells of the subset by one of 500 or 550.

Example 20 includes the subject matter of example 18, wherein a subband size for reporting at least one of a channel quality indicator (CQI) or a precoding matrix indicator (PMI) associated with each serving cell of the first subset is increased based on a scaling factor equal to a smallest integer greater than a quotient obtained by dividing the product of a subband size of that serving cell and a total number of resource blocks (RBs) of the serving cells of the subset by one of 500 or 550.

Example 21 includes the subject matter of example 13, wherein the first value indicates a set comprising at least one of a CSI process or a pair of the CSI process and a CSI subframe set.

Example 22 includes the subject matter of example 13, wherein the first subset is configured via higher layers.

Example 23 includes the subject matter of example 13, wherein the first value is one of at least eight values associated with the CSI request field, wherein at least six of the at least eight values are associated with subsets of the more than five serving cells.

Example 24 is an Evolved NodeB (eNB), comprising a processor, a receiver circuit, and a transmitter circuit. The processor is configured to assign each serving cell of more than five serving cells to at least one set of two or more sets; and generate a CSI request field value that indicates one of the two or more sets. The transmitter circuit is configured to transmit to a user equipment (UE) via the more than five serving cells according to a carrier aggregation (CA) mode, and to transmit the CSI request field value to the UE. The receiver circuit is configured to receive an aperiodic CSI report from the UE.

Example 25 includes the subject matter of example 24, wherein the more than five serving cells comprise at most thirty-two serving cells.

Example 26 includes the subject matter of example 24, wherein the transmitter circuit is configured to transmit the CSI request field value via at least one of a random access request (RAR) or a downlink control information (DCI) message.

Example 27 includes the subject matter of any of examples 24-26, including or omitting optional features, wherein the processor is configured to assign more than five serving cells to a first set of the two or more sets.

Example 28 includes the subject matter of example 24, wherein the CSI request field value is indicated via at least three bits, and wherein the two or more sets comprise six or more sets.

Example 29 includes the subject matter of example 24, wherein the processor is configured to assign more than five serving cells to a first set of the two or more sets.

Example 30 is a user equipment (UE), comprising means for receiving, means for processing, and means for transmitting. The means for receiving is configured to receive transmissions via a plurality of serving cells according to a carrier aggregation (CA) mode and to receive an aperiodic channel state information (CSI) reporting request that indicates a set for CSI reporting, wherein the plurality of serving cells comprises at least six serving cells, and wherein one or more of the plurality of serving cells is associated with the indicated set. The means for processing operably coupled to the means for receiving and configured to: calculate one or more CSI parameters for each serving cell of the plurality of serving cells that is associated with the indicated set; and generate an aperiodic CSI report based at least in part on the calculated CSI parameters for each serving cell associated with the indicated set. The means for transmitting is configured to transmit the aperiodic CSI report to an Evolved NodeB (eNB) via a physical uplink shared channel (PUSCH).

Example 31 is an Evolved NodeB (eNB), comprising means for processing, means for transmitting, and means for receiving. The means for processing is configured to: assign each serving cell of more than five serving cells to at least one set of two or more sets; and generate a CSI request field value that indicates one of the two or more sets. The means for transmitting is configured to transmit to a user equipment (UE) via the more than five serving cells according to a carrier aggregation (CA) mode, and to transmit the CSI request field value to the UE. The means for receiving is configured to receive an aperiodic CSI report from the UE.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the f unction in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A non-transitory machine readable medium comprising instructions that, when executed, cause a user equipment (UE) to:

receive a data payload transmitted via more than five serving cells according to a carrier aggregation (CA) mode and at most thirty-two serving cells;

receive a first value associated with a channel state information (CSI) request field, wherein the first value is associated with a first subset of the more than five serving cells;

calculate at least one CSI parameter for each serving cell of the first subset;

generate an aperiodic CSI report based at least in part on the at least one CSI parameter for each serving cell of the first subset; and transmit the aperiodic CSI report via a physical uplink shared channel (PUSCH).

2. The non-transitory machine readable medium of claim 1, wherein the first value is received via a random access request (RAR).

3. The non-transitory machine readable medium of claim 1, wherein the first value is received via a downlink control information (DCI) message.

4. The non-transitory machine readable medium of claim 1, wherein the first value is one of at least eight values associated with the CSI request field, wherein at least six of the at least eight values are associated with subsets of the more than five serving cells.

5. The non-transitory machine readable medium of claim 4, wherein each of the subsets comprises at most five of the more than five serving cells.

6. The non-transitory machine readable medium of claim 1, wherein the first subset comprises more than five of the more than five serving cells.

7. The non-transitory machine readable medium of claim 6, wherein a subband size for reporting at least one of a channel quality indicator (CQI) or a precoding matrix indicator (PMI) associated with each serving cell of the first subset is increased based on a scaling factor equal to a smallest integer greater than a quotient obtained by dividing a total number of resource blocks (RBs) of the serving cells of the subset by one of 500 or 550.

8. The non-transitory machine readable medium of claim 6, wherein a subband size for reporting at least one of a channel quality indicator (CQI) or a precoding matrix indicator (PMI) associated with each serving cell of the first subset is increased based on a scaling factor equal to a smallest integer greater than a quotient obtained by dividing the product of a subband size of that serving cell and a total number of resource blocks (RBs) of the serving cells of the subset by one of 500 or 550.

9. The non-transitory machine readable medium of claim 1, wherein the first value indicates a set comprising at least one of a CSI process or a pair of the CSI process and a CSI subframe set.

10. The non-transitory machine readable medium of claim 1, wherein the first subset is configured via higher layers.

11. An Evolved NodeB (eNB), comprising:
a processor configured to:
assign each serving cell of more than five serving cells to at least one set of two or more sets; and
generate a CSI request field value that indicates one of the two or more sets;
a transmitter circuit configured to transmit to a user equipment (UE) via the more than five serving cells according to a carrier aggregation (CA) mode, and to transmit the CSI request field value to the UE; and
a receiver circuit configured to receive an aperiodic CSI report from the UE, wherein the more than five serving cells comprise at most thirty-two serving cells.

12. The eNB of claim 11, wherein the transmitter circuit is configured to transmit the CSI request field value via at least one of a random access request (RAR) or a downlink control information (DCI) message.

13. The eNB of claim 11, wherein the processor is configured to assign more than five serving cells to a first set of the two or more sets.

14. The eNB of claim 11, wherein the CSI request field value is indicated via at least three bits, and wherein the two or more sets comprise six or more sets.

15. An apparatus of a user equipment (UE), comprising:
one or more processors configured to:
process data from more than five serving cells via carrier aggregation (CA) and an aperiodic channel state information (CSI) reporting request that indicates a set associated with the more than five serving cells for CSI reporting, wherein the more than five serving cells comprise at most thirty-two serving cells, and wherein the indicated set comprises at least one of: one or more CSI processes or {CSI process, CSI subframe set}-pairs; and
generate an aperiodic CSI report based on the indicated set; and
a transmitter circuit configured to transmit the aperiodic CSI report via a physical uplink shared channel (PUSCH).

16. The apparatus of claim 15, wherein the aperiodic CSI report request comprises a CSI request field that comprises at least three bits.

17. The apparatus of claim 15, wherein the one or more processors are further configured to process an uplink data control information (DCI) message or a random access request grant and derive a CSI request field value of the set.

18. The apparatus of claim 15, wherein the one or more processors are further configured to determine an uplink DCI format in a UE specific search space of a physical channel to determine a CSI request field value of a CSI request field.

19. The apparatus of claim 18, wherein the one or more processors are further configured to determine the CSI request field value of the set from among eight values that indicate different sets for the CSI reporting.

20. The apparatus of claim 19, wherein the different sets comprise different CSI processes.

21. The apparatus of claim 15, wherein the set further comprises at least one: CSI process or CSI subframe set pair, and the one or more processors are further configured to generate the aperiodic CSI report based on the at least one: CSI process or CSI subframe set pair.

22. The apparatus of claim 15, wherein the one or more processors are further configured to calculate one or more CSI parameters of the more than five serving cells associated with the indicated set, and generate the aperiodic CSI report based on the calculated one or more CSI parameters of the more than five serving cells.

23. The apparatus of claim 22, wherein the one or more CSI parameters comprise at least one of: a rank indicator (RI), a precoding matrix indicator (PMI), or a channel quality indicator (CQI).

24. The apparatus of claim 23, wherein a subband size associated with the CQI is increased in response to a determination that the total number of resource blocks (RBs) of the serving cells associated with the indicated set exceeds a predefined number of RBs, wherein the predefined number of RBs is one of 500 RBs or 550 RBs.

* * * * *